July 9, 1957  E. C. VAN CLEAVE  2,798,383
ROTOR BALANCING BOLT LOCK
Filed May 25, 1955
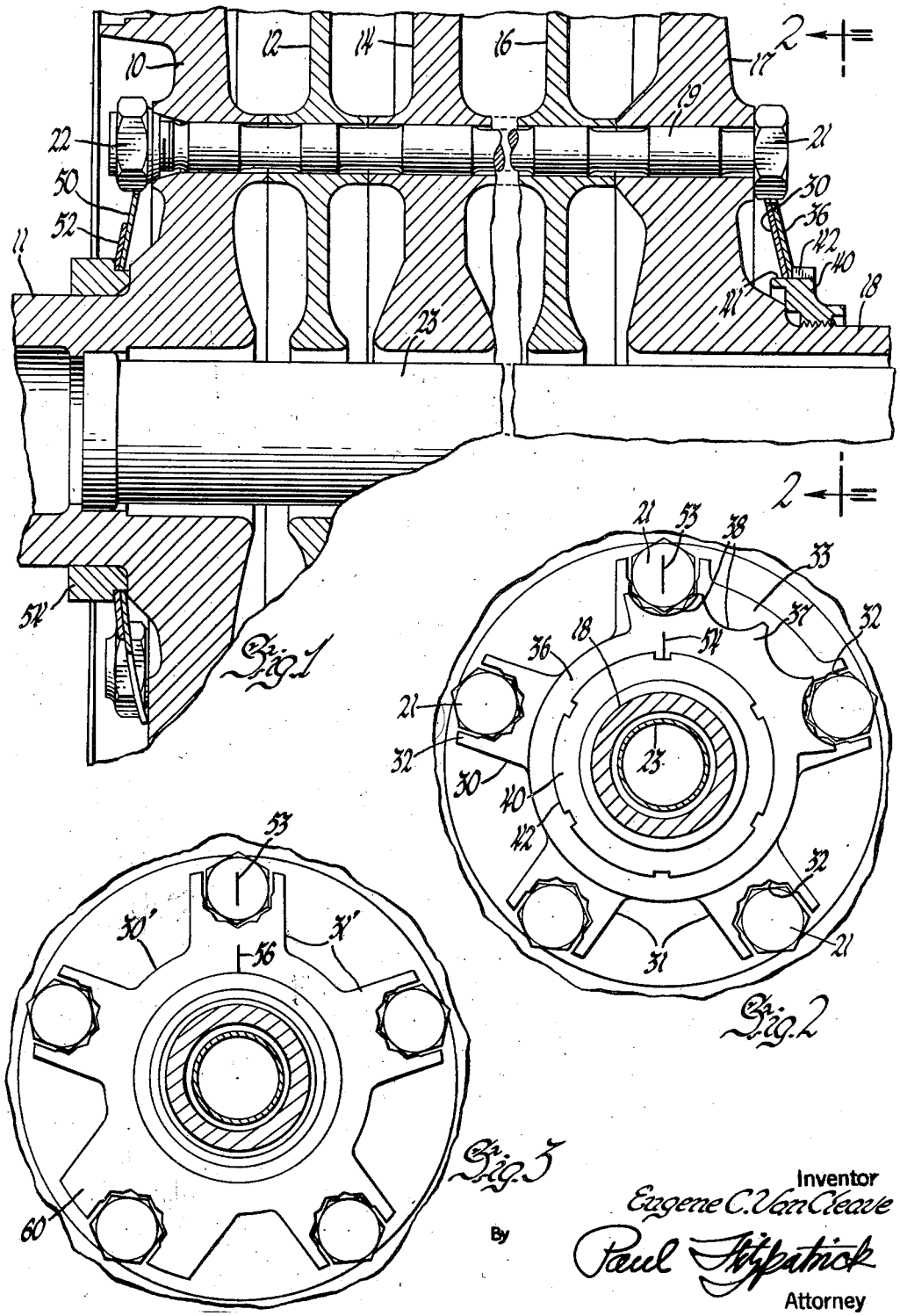
Inventor
Eugene C. Van Cleave
By
Paul Fitzpatrick
Attorney

United States Patent Office 2,798,383
Patented July 9, 1957

2,798,383

ROTOR BALANCING BOLT LOCK

Eugene C. Van Cleave, Indianapolis, Ind., assignor to General Motors Corporation, Detroit, Mich., a corporation of Delaware Application May 25, 1955, Serial No. 510,990

4 Claims. (Cl. 74—573)

My invention relates to composite rotor structures such as compressor and turbine rotors, and is particularly directed to means by which the tie bolts or the like of such are locked against loosening with a locking structure which also serves as a balancing means for the rotor.

Many axial-flow turbine or compressor rotors comprise a number of wheels or disks bolted or similarly fastened together to provide a multiple stage rotor. In such structures, it is common to balance each wheel with the blades thereon. Then, after the rotor is assembled, the assembly is dynamically balanced. Careful balancing is important in such machines because such rotors of usual dimensions ordinarily have rotational velocities of the order of five thousand to twenty thousand revolutions per minute.

One arrangement for fixing the wheels together utilizes a number of through bolts or tie bolts spaced from the axis of rotation and parallel thereto and distributed around the axis. It is essential to provide some means for locking the nuts of these tie bolts so that they cannot loosen in service.

The locking and balancing structure according to the invention provides a positive lock of the heads and nuts of the tie bolts and at the same time, through the provision of relatively angularly shiftable unbalanced parts, permits the introduction of unbalanced mass at each end of the rotor so that, by suitably aligning the locking means, the unbalance of the rotor without the aligning means may be compensated to the desired degree of accuracy.

The nature of the invention and the advantages thereof will be more clearly apparent from the appended detailed description of preferred embodiments of the invention and the accompanying drawings thereof in which:

Figure 1 is a fragmentary view of a typical gas turbine rotor taken in a plane containing the axis of the rotor;

Figure 2 is a fragmentary sectional view transverse to the axis taken on the plane indicated by the line 2—2 in Figure 1; and Figure 3 is a view similar to Figure 2 of a partially assembled structure illustrating a second embodiment of the invention.

Referring first to Figure 1, there is illustrated a turbine or a compressor rotor of known type, the details of which will require little explanation. The assembly comprises a first stage wheel or disk 10 integral with a stub shaft 11, an interstage spacer disk 12, a second stage wheel 14, an interstage spacer disk 16 and a last stage wheel 17 integral with a stub shaft 18. The disks 10, 12, 14, 16 and 17 may be aligned by pilots, splines, or dowels (not shown) and are held together by five tie bolts 19, each tie bolt having a head 21 and having threaded thereon a nut 22. A tubular heat shield 23 may be mounted interiorly of the disks. Stub shafts 11 and 18 are mounted in suitable bearings for rotation when the rotor is installed in an engine.

Referring now also to Figure 2, the heads 21 of the tie bolts 19 are held against rotation by an inner or locking plate or disk 30 which, as illustrated in these figures, is in the form of a ring with projecting ears 31, each of which has formed therein a partial twelve point socket 32 which, as will be apparent from Figure 2, engages or embraces the head 21 and may lock it against rotation in any of twelve angular positions of the head separated by 30 degrees. Since, in the illustrated embodiment, there are five bolts 21 and the plate 30 has five sockets 32, it may be installed in any of five equally spaced angular positions about the axis of the rotor. Plate 30 is out of balance with respect to the axis of the engine, the unbalance being due to the presence of additional material between two of the sockets 32 as indicated at 33. Thus, the plate 30 provides an unbalanced mass which may be oriented in 72° intervals around the rotor axis.

Lying against the inner plate 30 is an outer or balancing plate or disk 36 which has a central circular opening and which, as shown more clearly in Figure 2, is provided with an outwardly extending portion 37 which is fluted or scalloped to provide four arcuate recesses 38 in the edge. As illustrated, these recesses are spaced 24 degrees apart around the rotor axis, and the disk 36 may be located circumferentially of the axis by engagement of any of these recesses with one of the bolt heads 21, so that it may be set in any position around the axis in increments of 24°. As will be apparent, the outwardly extending portion 37 of the balancing plate 36 constitutes an unbalanced mass.

As will be apparent, the orientation of the unbalance due to the disks 30 and 36 is a function of the orientation of the disks. The magnitude of the resultant unbalanced mass is determined by the relative orientation of the two disks, which may be varied, and the angular position of the resulting unbalance is a function of the angular position of the two disks, regarded as an assembly. As illustrated in Figure 2, the outward extensions of the two disks are in alignment so that maximum unbalance is achieved.

In the installation of the plates, the bolt heads are aligned so that the locking plate 30 may slip into place over the heads, and then plate 36 is put on against plate 30. These plates are retained by any suitable arrangement, such as a collar 40 threaded on the stub shaft 18 and abutting turbine wheel 17. Collar 40 includes a cylindrical portion 41 which centers the disks 30 and 36 and a flange 42 which provides a shoulder to retain the disks and is notched to receive a spanner wrench.

Preferably, the nut 22 is of the same external dimensions as the bolt head 21 and the nut may be locked by front locking plate 50 which may be identical with the rear plate 30 already described and the front of the rotor may be additionally compensated for unbalance by a front balance plate 52 which may be identical to rear balance plate 36. These plates are piloted on a shouldered collar 54 which may be either a ring installed temporarily for balancing the rotor or a spacer ring fixed between the bearing for stub shaft 11 and the front rotor wheel 10. As will be apparent, because of the twelve point construction of the sockets 32, the nuts may be tightened to a suitable degree and may be oriented so that the nut lock will slip over the nuts and will hold them against backing off.

After the assembly is completed, the orientation of the disks 30, 36 and 50, 52 may be changed in accordance with the results of balancing tests to reduce unbalance. The procedure for determination of unbalance is not material to the present invention.

When the proper orientation has been determined, reference marks 53 on one of the bolts, 54 on the outer plate 36 and 56 (Figure 3) on the inner plate are provided, by etching or otherwise, so that the parts, if removed, can be replaced in proper orientation.

Figure 3 shows a modified locking plate 30', the balance plate and collar being omitted from this figure. The plate 30' differs from the plate 30 only in the provision for unbalance by widening one of the lugs. In this case, lugs or projections 31' are of one width and a lug 60 is wider to provide unbalanced mass.

It will be apparent, of course, that various means may be adapted to provide unbalance in the locking and balancing plates, but since preferably these are made of sheet metal, the simplest way to do so is to provide an unbalanced area at one side.

The simplicity and utility of the invention will be apparent from the foregoing. As will be seen, it provides a positive lock preventing rotation of the tie bolts or tie bolt nuts and provides a variable unbalanced mass at each end of the rotor which may be adjusted to minimize unbalance of the rotor assembly.

The invention may be embodied in diverse structures adapted to the requirements of different rotors or different fastening means. The detailed description herein of preferred embodiments of the invention for the purpose of explaining the principles thereof is not to be considered as limiting or restricting the invention, as various modifications may be made by the exercise of skill in the art.

I claim:

1. A rotor comprising, in combination, at least two bodies rotatable about a common axis, fastening means for securing the bodies together including a part rotatable about a second axis spaced from the first axis, the rotatable part having a non-circular periphery, and a balancing and locking member mounted on the rotor so as to be shiftable about the axis of the rotor and having a plurality of non-circular sockets adapted to receive the rotatable part to hold it against rotation about the second axis, the rotatable part being adapted to hold the member against rotation about the first axis by engagement in one of the sockets, the member having a center of mass spaced from the first axis.

2. A rotor comprising, in combination, at least two bodies rotatable about a common axis, fastening means for securing the bodies together including a part rotatable about a second axis spaced from the first axis, the rotatable part having a non-circular periphery, a first balancing member mounted on the rotor so as to be shiftable about the axis of the rotor and having a plurality of non-circular sockets adapted to receive the rotatable part to hold it against rotation about the second axis, the rotatable part being adapted to hold the member against rotation about the first axis by engagement in one of the sockets, and a second balancing member mounted on the rotor so as to be shiftable about the axis of the rotor and engageable with the rotatable part to hold the second balancing member against rotation about the first axis, the members having centers of mass spaced from the first axis.

3. In combination, a composite rotor comprising at least two bodies jointly rotatable about an axis, a number of means for securing the bodies together, the means being spaced from and distributed around the axis, each said means including a rotatable fastener, a member mounted on the rotor so as to be shiftable about the axis of the rotor and engageable with said rotatable fasteners so as to hold the fasteners against rotation, the fasteners holding the member from rotation around the axis, the member being engageable with the fasteners in a plurality of angular positions about the axis, and the member having its center of mass spaced from the axis so that it may compensate unbalance of the rotor.

4. In combination, a composite rotor comprising at least two bodies jointly rotatable about an axis, a number of means for securing the bodies together, the means being spaced from and distributed around the axis, each said means including a rotatable fastener, a first member mounted on the rotor so as to be shiftable about the axis of the rotor and engageable with said rotatable fasteners so as to hold the fasteners against rotation, a second member mounted on the rotor so as to be shiftable about the axis of the rotor and engageable with said fasteners, the fasteners holding the members from rotation around the axis, each member being engageable with the fasteners in a plurality of angular positions about the axis, and the members having their centers of mass spaced from the axis so that they may compensate unbalance of the rotor.

References Cited in the file of this patent

UNITED STATES PATENTS

| | | |
|---|---|---|
| 697,128 | Bomgren | Apr. 8, 1902 |
| 1,584,425 | Best | May 11, 1926 |
| 1,980,693 | Newman et al. | Nov. 13, 1934 |
| 2,336,697 | Moeller | Dec. 14, 1943 |